United States Patent
Whangbo et al.

(10) Patent No.: US 8,305,530 B2
(45) Date of Patent: Nov. 6, 2012

(54) DISPLAY DEVICE, METHOD OF MANUFACTURING THE SAME, AND APPARATUS OF BONDING SUBSTRATES

(75) Inventors: Song-Woo Whangbo, Seoul (KR); Woo-Jae Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 514 days.

(21) Appl. No.: 12/412,700

(22) Filed: Mar. 27, 2009

(65) Prior Publication Data

US 2009/0322980 A1 Dec. 31, 2009

(30) Foreign Application Priority Data

Jun. 27, 2008 (KR) .................. 10-2008-0061770

(51) Int. Cl.
*G02F 1/1333* (2006.01)
*G02F 1/1339* (2006.01)

(52) U.S. Cl. ....................... 349/122; 349/153
(58) Field of Classification Search ............ 349/122, 349/153
See application file for complete search history.

(56) References Cited

U.S. PATENT DOCUMENTS

| 2004/0075801 A1 * | 4/2004 | Choi et al. ............... 349/153 |
| 2004/0165127 A1 * | 8/2004 | Lin et al. ................ 349/110 |
| 2007/0263159 A1 * | 11/2007 | Kobayashi et al. ......... 349/153 |

FOREIGN PATENT DOCUMENTS

| JP | 58153920 A | * | 9/1983 |
| JP | 2000-094523 | | 4/2000 |
| JP | 2003-001708 | | 1/2003 |
| JP | 2005-332909 | | 12/2005 |
| KR | 1998-017846 | | 6/1998 |
| KR | 2006040104 | * | 5/2006 |

* cited by examiner

*Primary Examiner* — Uyen-Chau N Le
*Assistant Examiner* — Chris Chu
(74) *Attorney, Agent, or Firm* — F. Chau & Associates, LLC (57) ABSTRACT

A display device includes first and second plastic substrates. The first substrate is directly bonded to the second plastic substrate by heat and pressure. When the display device is manufactured, a process of forming a coupling member interposed between the first and second plastic substrates may be omitted, thereby preventing deterioration of reliability of the display device due to the coupling member.

17 Claims, 7 Drawing Sheets

DISPLAY DEVICE, METHOD OF MANUFACTURING THE SAME, AND APPARATUS OF BONDING SUBSTRATES

CROSS-REFERENCE TO RELATED APPLICATION

This application claims priority to Korean Patent Application No. 2008-61770 filed on Jun. 27, 2008, the contents of which are herein incorporated by reference in their entirety.

BACKGROUND

1. Technical Field

The present invention relates to a display device, a method of manufacturing the display device capable of improving reliability of the display device while facilitating the manufacturing process, and a substrate bonding device for the display device.

2. Discussion of the Related Art

A display device displaying an image by using light supplied from a light source may include an optical shutter interposed between two substrates that face each other. The optical shutter adjusts a quantity of light passing through the two substrates. A liquid crystal display includes liquid crystal serving as the optical shutter between the two substrates.

A plastic liquid crystal display, which is a kind of liquid crystal display, includes two plastic substrates, liquid crystal interposed between the two plastic substrates, and a coupling agent interposed between the two substrates to seal the liquid crystal and couple the two substrates to each other.

The coupling agent may be cured by heat or light. Accordingly, when manufacturing the plastic liquid crystal display, heat or light is applied to the coupling agent in order to strongly couple the two substrates to each other. However, the two plastic substrates are susceptible to deformation by heat or light, and the coupling agent exerts a lower coupling force on the plastic substrates as compared with glass substrates. Accordingly, when the plastic substrates are coupled to each other by using the coupling agent, the plastic substrates may be deformed or separated from each other.

SUMMARY

Therefore, exemplary embodiments of the present invention provide a display device having improved reliability, a method of manufacturing the display device, wherein the method is capable of improving reliability of the display device while facilitating the manufacturing process, and a substrate bonding apparatus for the display device.

According to an exemplary embodiment of the present invention, a display device includes a first plastic substrate, a plurality of pixels, and a second plastic substrate. The first plastic substrate has a display area and a peripheral area surrounding the display area defined thereon. The pixels are arranged in the display area. The second plastic substrate faces the first plastic substrate. The first substrate and the second substrate are in contact with each other in the peripheral area to be bonded to each other in the peripheral area.

According to an exemplary embodiment of the present invention, a method of manufacturing a display device is performed as follows. A first plastic substrate is prepared. The plastic substrate has a display area and a peripheral area surrounding the display area defined thereon. A plurality of pixels are formed in the display area. The first and second plastic substrates are arranged such that the first plastic substrate faces the second plastic substrate. Heat and pressure are applied to at least one of the first plastic substrate and the second plastic substrate at a location corresponding to the peripheral area, so that the first and second plastic substrates are melted by the heat and pressure. As a result, the first plastic substrate and the second plastic substrate are bonded to each other.

According to an exemplary embodiment of the present invention, a substrate bonding apparatus that bonds plastic substrates to each other includes a body, a pressing member, a driving shaft, and a heating member. The pressing member is positioned in the body. The driving shaft is connected to the pressing member to move the pressing member. The heating member supplies heat to the pressing member.

According to the above, heat and pressure are applied to first and second plastic substrates, so that the first and second plastic substrates are coupled to each other without an additional coupling member. Thus, when the display device is manufactured, a process of forming the coupling member interposed between the first and second plastic substrates may be omitted, thereby preventing deterioration of reliability of the display device due to the coupling member.

BRIEF DESCRIPTION OF THE DRAWINGS

Exemplary embodiments of the present invention will become readily apparent by reference to the following detailed description when considered in conjunction with the accompanying drawings wherein.

DESCRIPTION OF EMBODIMENTS

Hereinafter, exemplary embodiments of the present invention will be explained in more detail with reference to the accompanying drawings. This invention may, however, be embodied in many different forms and should not be construed as limited to the embodiments set forth herein.

The same reference numerals may be used to designate the same elements throughout the drawings.

Figure 1:
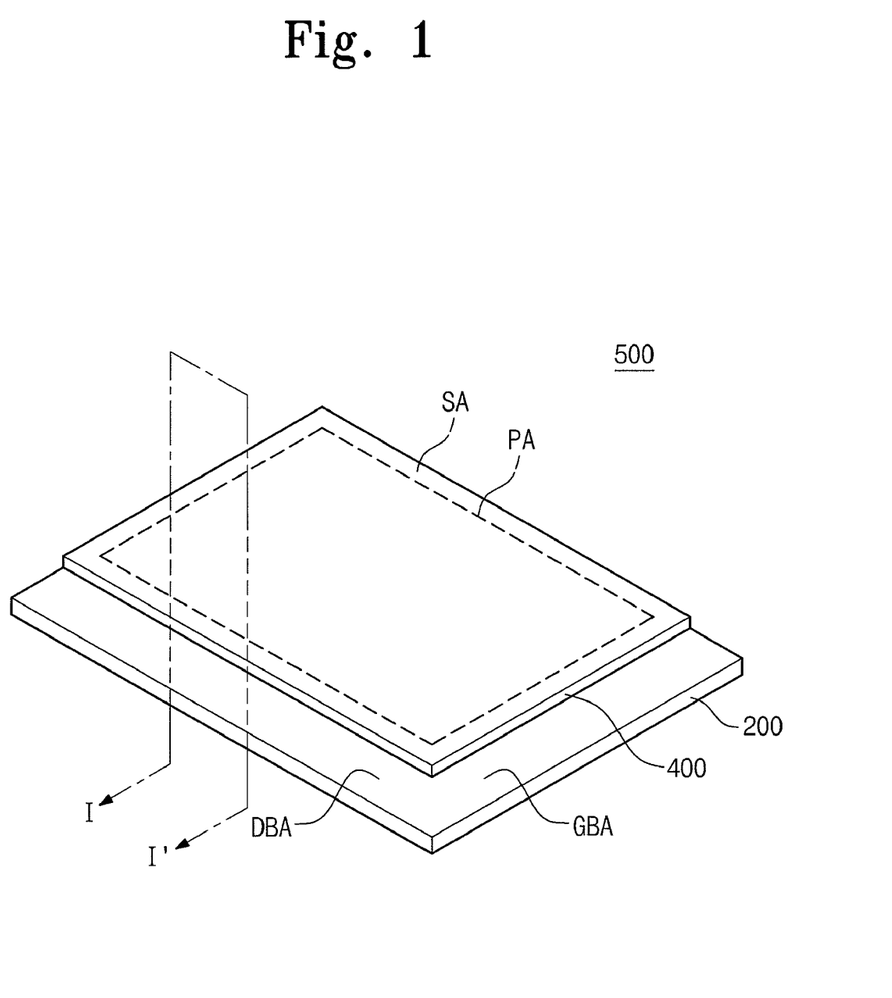
FIG. 1 is a perspective view showing a display device according to an exemplary embodiment of the present invention.

FIG. 1 is a perspective view showing a display device according to an exemplary embodiment of the present invention.

Referring to FIG. 1, the display device 500 includes a first substrate 200, a second substrate 400 facing the first substrate 200, and an optical shutter 350 (see, FIG. 2A) interposed between the first substrate 200 and the second substrate 400.

The first substrate 200 includes a display area PA and a peripheral area SA defined thereon. An image is displayed in display area PA, and the peripheral area SA corresponds to a border area of the first substrate 200 and surrounds the display area PA.

The first substrate 200 serves as an array substrate for the display device 500 and includes pixels arranged in the display area PA. Each pixel may include a thin film transistor and a pixel electrode electrically connected to the thin film transistor, or may include a light emitting device such as an organic light emitting diode.

The second substrate 400 serves as a color filter substrate for the display apparatus 500 and faces the first substrate 200. In addition, the second substrate 400 makes direct contact with the first substrate 200 in the peripheral area SA without an additional coupling member, so that the second substrate 400 is coupled to the first substrate 200. The first substrate 200 may be coupled to the second substrate 400 in the peripheral area SA by heat and pressure.

A gate bonding area GBA and a data bonding area DBA are defined on an exposed area of the first substrate 200. Although not shown in FIG. 1, the display device 500 further includes a gate driver (not shown) electrically connected with the first substrate 200 in the gate bonding area GBA and a data driver (not shown) electrically connected with the first substrate 200 in the data bonding area DBA. The first substrate 200 receives signals and data from the gate and data drivers, which are used to display an image.

Figure 2A:
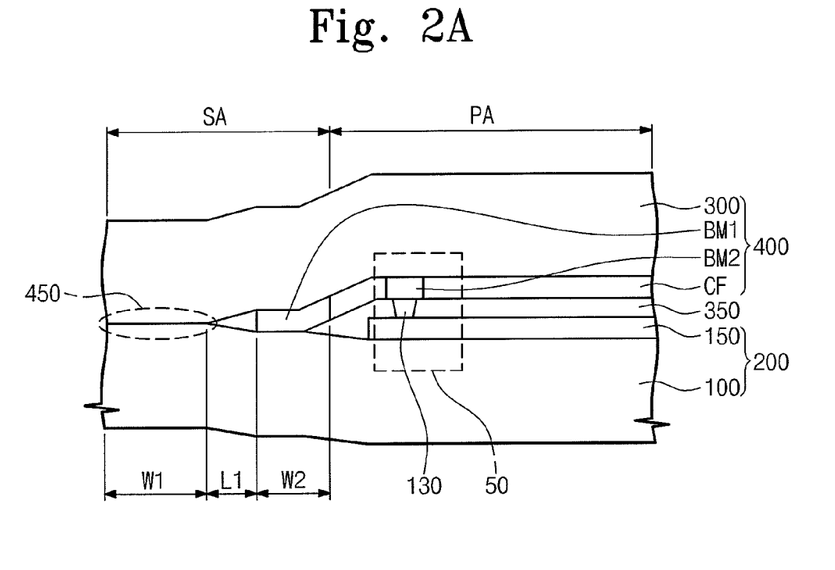
FIG. 2A is a sectional view taken along a line I-I' of FIG. 1.
Figure 2B:
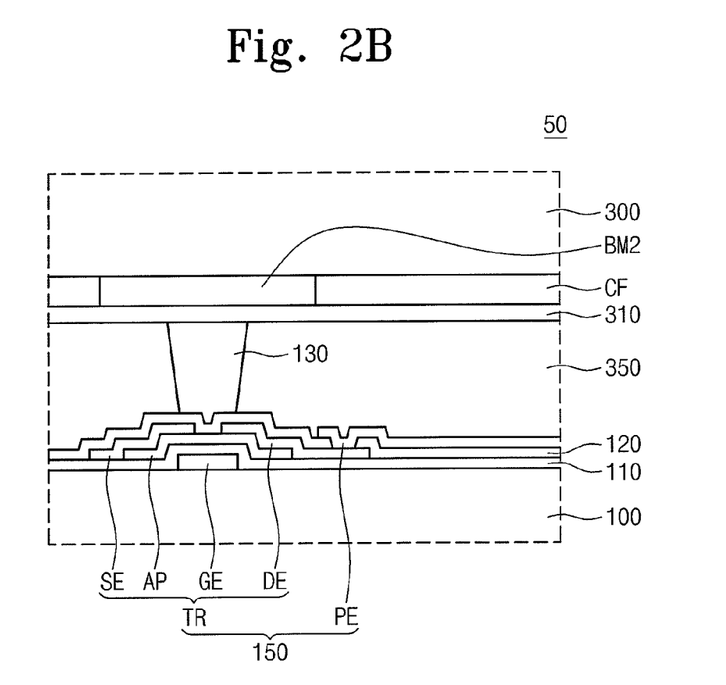
FIG. 2B is a partially enlarged view of a portion of FIG. 2A.

FIG. 2A is a sectional view taken along a line I-I' of FIG. 1, and FIG. 2B is a partially enlarged view of a portion of FIG. 2B.

Referring to FIGS. 2A and 2B, the first substrate 200 includes a first plastic substrate 100 and a plurality of pixels arranged on the first plastic substrate 100. According to an exemplary embodiment, the pixels have the same function and the same structure, and one pixel 150 is representatively shown in FIGS. 2A and 2B.

Since the first plastic substrate 100 includes plastic, the first plastic substrate 100 is flexible. In more detail, the first plastic substrate 100 may include thermo-setting plastic so that the first plastic substrate 100 including the thermo-setting plastic prevents a bonded part with a second plastic substrate 300 from being deformed by heat applied during bonding with the second plastic substrate 300. The thermo-setting plastic may include at least one of polyethylene terephthalate (PET), poly carbonate (PC), polyethylene naphthalate (PEN), polyether sulfone (PES), and fiber reinforced plastic (FRP).

The pixel 150 includes a thin film transistor TR and a pixel electrode PE electrically connected to the thin film transistor TR. The thin film transistor TR includes a gate electrode GE, an active pattern AP arranged on the gate electrode GE such that a gate dielectric layer 110 is interposed between the active pattern AP and the gate electrode GE, a source electrode SE arranged on the active pattern AP, and a drain electrode DE spaced apart from the source electrode SE and arranged on the active pattern.

An interlayer dielectric layer 120 is provided on the thin film transistor TR and partially exposes the drain electrode DE. The pixel electrode PE is provided on the interlayer dielectric layer 120 and is electrically connected to the exposed portion of the drain electrode DE.

Although not shown in FIGS. 2A and 2B, the first plastic substrate 100 may further include a gate line (not shown) and a data line (not shown) formed thereon and electrically connected to the thin film transistor TR. The gate line transmits a gate signal to turn on the thin film transistor TR, and the data line transmits a data signal applied to the pixel electrode PE.

The second substrate 400 includes a second plastic substrate 300, a first light blocking layer BM1, a second light blocking layer BM2, a color filter CF, a spacer 130, and a common electrode 310.

Like the first plastic substrate 100, the second plastic substrate 300 is flexible. In more detail, the second plastic substrate 100 may include thermo-setting plastic such as at least one of polyethylene terephthalate (PET), poly carbonate (PC), polyethylene naphthalate (PEN), polyether sulfone (PES), and fiber reinforced plastic (FRP).

The first light blocking layer BM1 and the second light blocking layer BM2 include the same material. The first light blocking layer BM1 and the second light blocking layer BM2 are provided on the second plastic substrate 300 to block light exiting to the outside through the first substrate 200.

The second light blocking layer BM2 faces the thin film transistor TR, and is arranged between pixels. The first light blocking layer BM1 is arranged on the second plastic substrate 300 corresponding to the peripheral area SA. When viewed in a plan view, the first light blocking layer BM1 has a strip shape extending along the peripheral area of the substrate 200.

The second plastic substrate 300 is bonded to the first plastic substrate 100 in the peripheral area SA. Part of the first plastic substrate 100 bonded to the second plastic substrate 300 is defined as a bonded part 450. The bonded part 450 is formed by melting the first and second plastic substrates 100 and 300 using heat. The bonded part 450 may have a first width W1 of 1 mm or less. In other words, even if the first width W1 is 1 mm or less, the first and second plastic substrates 100 and 300 can be strongly bonded to each other without any adverse effect on the reliability of the display device 500.

The first light blocking layer BM1 is adjacent to the bonded part 450, so that the first light blocking layer BM1 partially contacts the first plastic substrate 100. Accordingly, the distance, that is, a cell gap between the first and second substrates 200 and 400 may be increased depending on the thickness of the first light blocking layer BM1 in the peripheral area SA.

For the convenience of explanation, a cell gap corresponding to the edge of the display area PA is referred to as a first cell gap, and a cell gap, which corresponds to a central portion of the display area PA and is maintained by the spacer 130, is referred to as a second cell gap. If the first light blocking layer BM1 does not maintain the distance between the first and second substrates 200 and 400 to a thickness of the first light blocking layer BM1 in the peripheral area SA, a difference between the first and second cell gaps increases since the cell gap of the bonded part 450 is zero. However, according to the an exemplary embodiment of the present invention, since the first light blocking layer BM1 separates the first substrate 200 from the second substrate 400 in the peripheral area SA by the thickness of the light blocking layer BM1, the difference between the first and second cell gaps may be reduced.

A width of the first light blocking layer BM1 is referred to as a second width W2, and a distance between the bonded part 450 and the first light blocking layer BM1 is referred to as a first length L1. The first length L1 and the second width W2 may be changed in order to reduce the difference between the first cell gap and the second cell gap.

The optical shutter 350 is interposed between the first and second substrates 200 and 400 to adjust a quantity of light transmitting from the first substrate 200 or the second substrate 400. In more detail, although not shown in FIG. 2A, the display device 500 may further include a backlight unit (not shown) that is provided under the first substrate 200 to supply light to the first substrate 200 and the second substrate 400. The optical shutter 350 adjusts the quantity of the light that is emitted from the backlight unit and exits to the outside after the light passes through the first substrate 200 and the second substrate 400. According to an exemplary embodiment of the present invention, the optical shutter 350 may be liquid crystal. If the optical shutter 350 is the liquid crystal, a director of the liquid crystal can be adjusted by an electric field formed between the common electrode 310 and the pixel electrode PE.

FIGS. 3, 4, 5A and 5B are views showing an exemplary embodiment of a method of manufacturing the display apparatus 500 shown in FIG. 1. In FIGS. 3, 4, 5A and 5B, the same reference numerals denote the same elements as in FIGS. 1, 2A and 2B.

Figure 3:
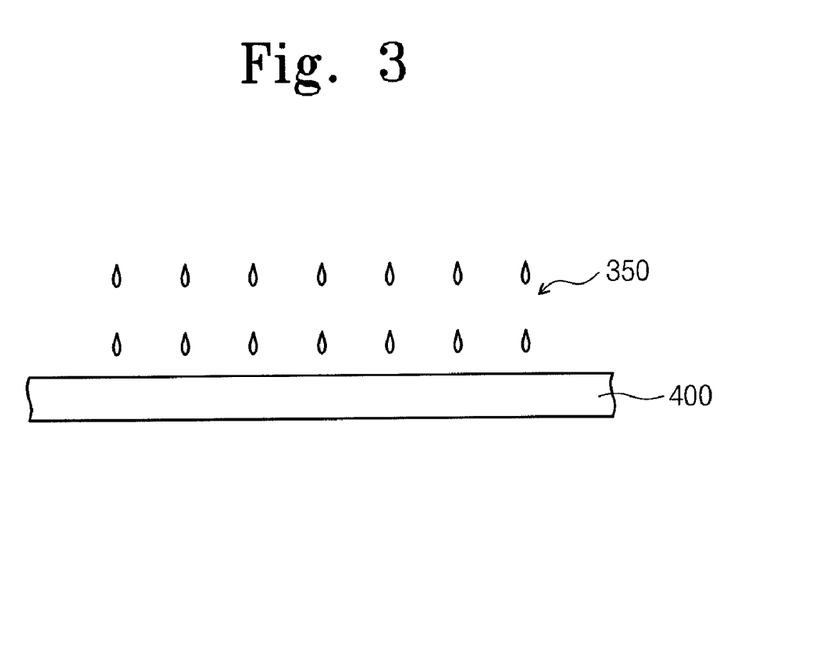
FIGS. 3, 4, 5A and 5B are views showing a method of manufacturing the display apparatus shown in FIG. 1, according to an exemplary embodiment of the present invention.

Referring to FIGS. 2A and 3, after forming the first light blocking layer BM1, the second light blocking layer BM2, the color filter CF, the spacer 130, and the common electrode 310 on the second plastic substrate 300 to form the second substrate 400, the optical shutter 350 is disposed on the second substrate 400. According to an exemplary embodiment of the present invention, since the optical shutter 350 includes the liquid crystal as described above, the optical shutter 350 is dropped onto the second substrate 400.

When the optical shutter 350 is disposed on the second substrate 400, the first light blocking layer BM1 formed along the peripheral area SA may serve as a dam to prevent the dropped optical shutter 350 from flowing to the outside of the second substrate 400.

Figure 4:
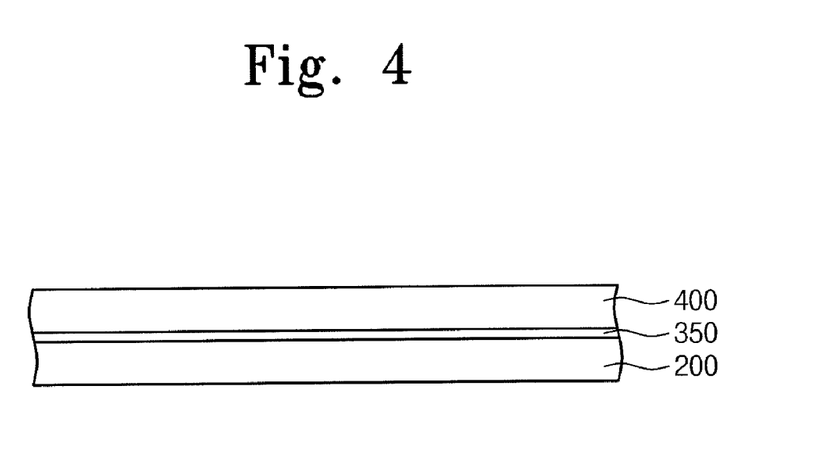

Referring to FIGS. 2B and 4, after forming the pixel 150 including the thin film transistor TR and the pixel electrode PE on the first plastic substrate 100 to form the first substrate 200, the first and second substrates 200 and 400 are positioned opposite each other such that the optical shutter 350 is interposed between the first and second substrates 200 and 400.

Figure 5A:
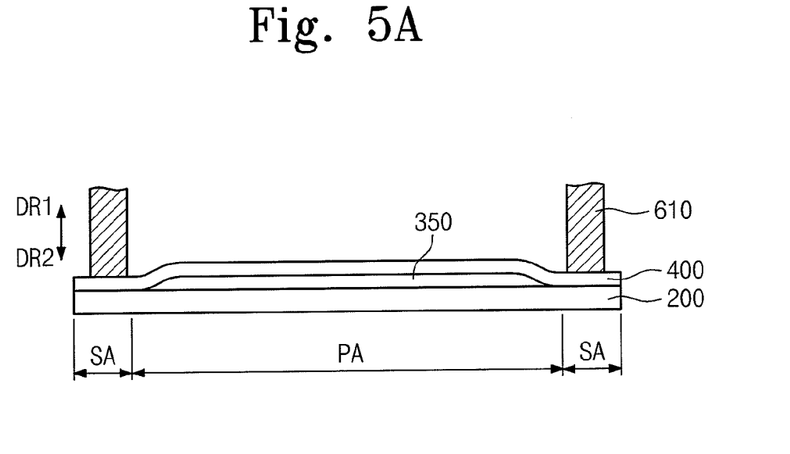
Figure 5B:
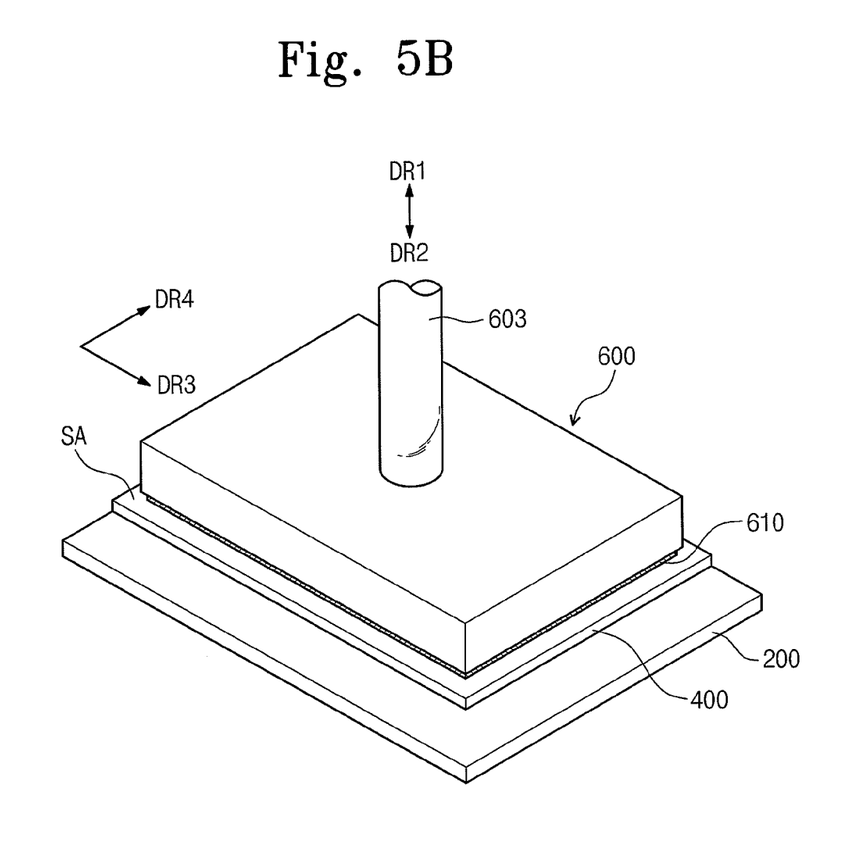

Referring to FIGS. 5A and 5B, the first and second substrates 200 and 400 are pressed at the peripheral area SA by using a pressing member 610 of a substrate bonding apparatus 600. Accordingly, the first substrate 200 is bonded to the second substrate 400 in the peripheral area SA by heat and pressure supplied from the pressing member 610.

The substrate bonding apparatus 600 includes a driving shaft 603, the pressing member 610 coupled to the driving shaft 603, and a heating member 607 (see FIG. 9) to heat the pressing member 610. The driving shaft 603 moves in first and second directions DR1 and DR2. The pressing member 610 coupled to the driving shaft 603 can move in the first and second directions DR1 and DR2 with the driving shaft 603.

When viewed in a plan view, the pressing member 610 has a shape including sides extending in parallel to lateral sides of the first substrate 200 having a rectangular shape. For example, the first substrate 200 has long lateral sides parallel to a third direction DR3, and short lateral sides parallel to a fourth direction DR4 and perpendicular to the third direction DR3. In a plan view, the pressing member 610 has a shape including sides extending in parallel to the long and short lateral sides of the first substrate 200. Thus, the substrate bonding apparatus 600 can bond the first substrate 200 to the second substrate 400 by once pressing the first substrate 200 to the second substrate 400.

When the pressing member 610 supplies heat and pressure to the first and second substrates 200 and 400 to bond the first substrate 200 to the second substrate 400, the quantity of the heat and the pressure may be varied according to materials of the first and second plastic substrates 100 and 300.

For example, when the first and second plastic substrates 100 and 300 include ethylene terephthalate, the temperature of the heat may be in the range of about 130° C. to about 250° C., and the pressure may be in the range of about 30 MPa to about 70 MPa. In addition, when the first and second plastic substrates 100 and 300 include PC, the temperature of the heat may be in the range of about 170° C. to about 280° C., and the pressure may be in the range of about 50 MPa to about 85 MPa. When the first and second plastic substrates 100 and 300 include PEN, the temperature of the heat may be in the range of about 150° C. to about 270° C., and the pressure may be in the range of about 30 MPa to about 70 MPa. When the first and second plastic substrates 100 and 300 include PES, the temperature of the heat may be in the range of about 230° C. to about 300° C., and the pressure may be in the range of about 50 MPa to about 100 MPa.

FIGS. 6A, 6B, 7 and 8 are views showing another method of manufacturing the display device according to an exemplary embodiment of the present invention.

Figure 6A:
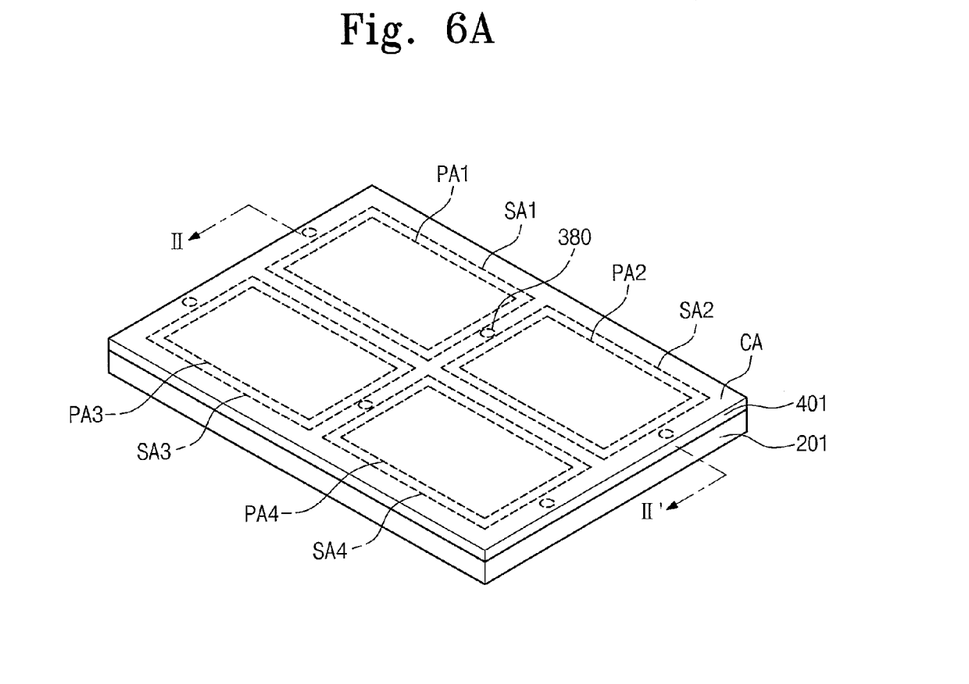
FIGS. 6A, 6B, 7 and 8 are views showing a method of manufacturing the display apparatus according to an exemplary embodiment of the present invention.
Figure 6B:
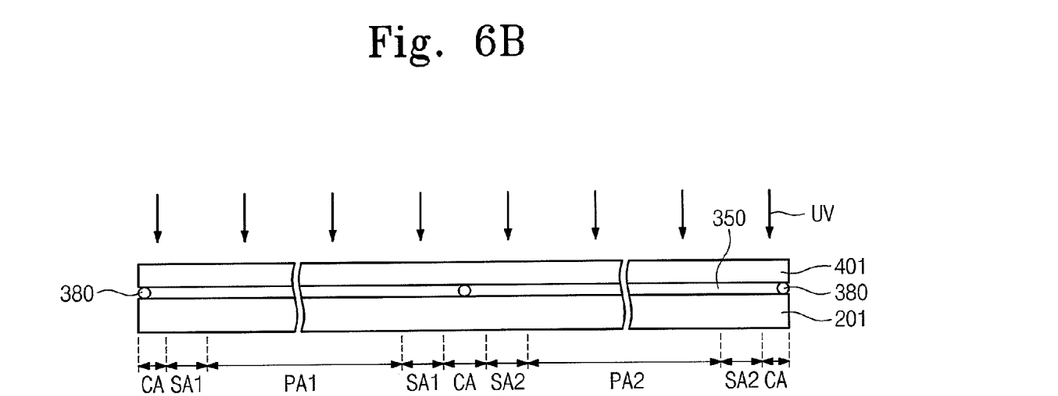

Referring to FIGS. 6A and 6B, a first mother substrate 201 includes a plurality of the first substrates 200, and a second mother substrate 401 includes a plurality of the second substrates 400. In other words, the first and second mother substrates 201 and 401 are process targets used for a plurality of display devices. Accordingly, the plurality of display devices including the display area and the peripheral area surrounding the display area have the same structure as that of the display device 500 shown in FIG. 1.

For example, a display device including a first display area PA1 and a first peripheral area SA1 surrounding the first display area PA1 has the same structure as that of the display device 500 shown in FIG. 1.

The first and second mother substrates 201 and 401 face each other with the optical shutter 350 interposed therebetween. A plurality of display areas PA1, PA2, PA3, and PA4, a plurality of peripheral areas SA1, SA2, SA3, and SA4 respectively surrounding the display areas PA1, PA2, PA3, and PA4, and a cutting area CA, which is located outside the peripheral areas SA1, SA2, SA3, and SA4, are defined on the first mother substrate 210.

Before the first mother substrate 201 is arranged to face the second mother substrate 401, a coupling agent 380 is arranged at portions of the cutting area CA of the first and second mother substrates 201 and 401. The coupling agent 380 is cured by light or heat. After the first mother substrate 201 is arranged to face the second mother substrate 401, an ultra-violet (UV) ray is irradiated onto the first and second mother substrates 201 and 401 to cure the coupling agent 380. Accordingly, the first and second mother substrates 201 and 401 may be preliminarily coupled to each other.

Figure 7:
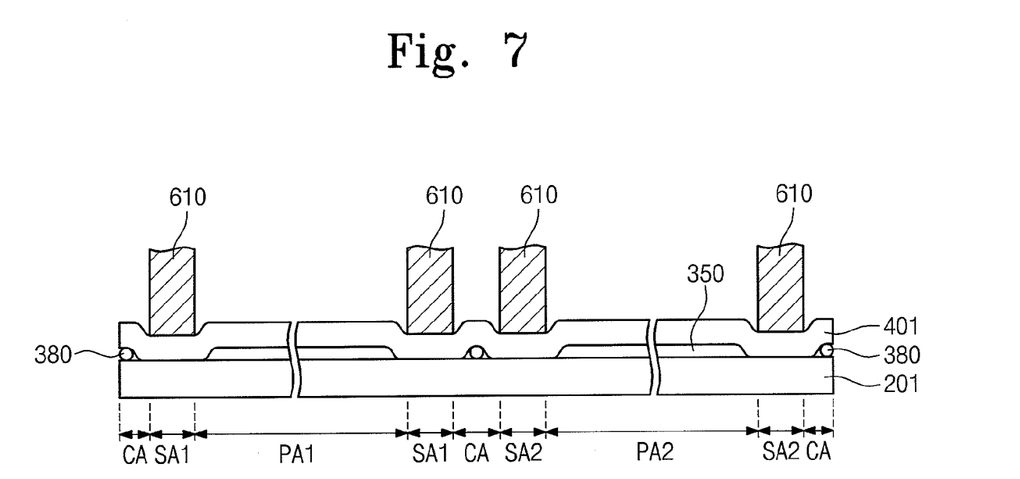

Referring to FIGS. 6A and 7, after the first and second mother substrates 201 and 401 are preliminarily coupled to each other by using the coupling agent 380, the first and second mother substrates 201 and 401 are pressed corresponding to the first to fourth peripheral areas SA1, SA2, SA3, and SA4 by using pressing members 610. According to an embodiment of the present invention, a plurality of pressing members 610 corresponding to each of the display devices simultaneously apply pressure and heat to the first to fourth peripheral areas SA1, SA2, SA3 and SA4. Thus, the first mother substrate 201 is bonded to the second mother substrate 401 by heat and pressure transmitted to the first to fourth peripheral areas SA1, SA2, SA3, and SA4 from the pressing members 610.

Meanwhile, since the first mother substrate 201 is preliminarily coupled to the second mother substrate 401 by the coupling agent 380 as described above, the first and second mother substrates 201 and 401 may be prevented from moving when the first mother substrate 201 is bonded to the second mother substrate 401 by using the pressing members 610. Accordingly, the first mother substrate 201 may be exactly bonded onto the second mother substrate 401.

Figure 8:
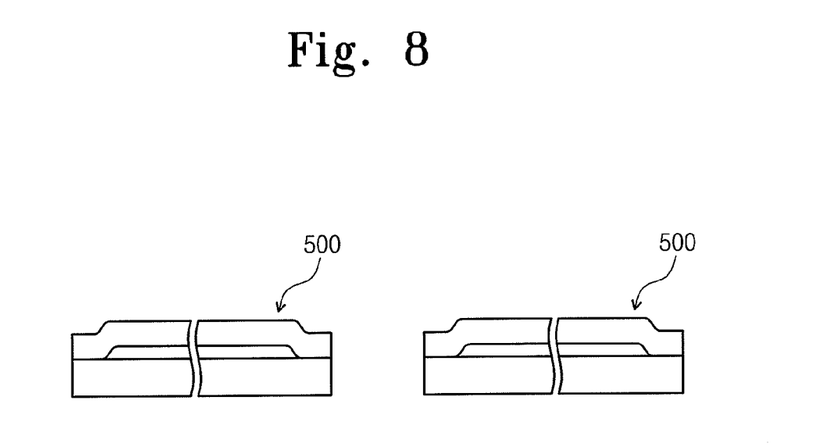

Referring to FIGS. 7 and 8, after the first mother substrate 201 is bonded onto the second mother substrate 401 by using the pressing members 610, the first and second mother substrates 201 and 401 are cut along the cutting area CA to form the display devices 500.

Figure 9:
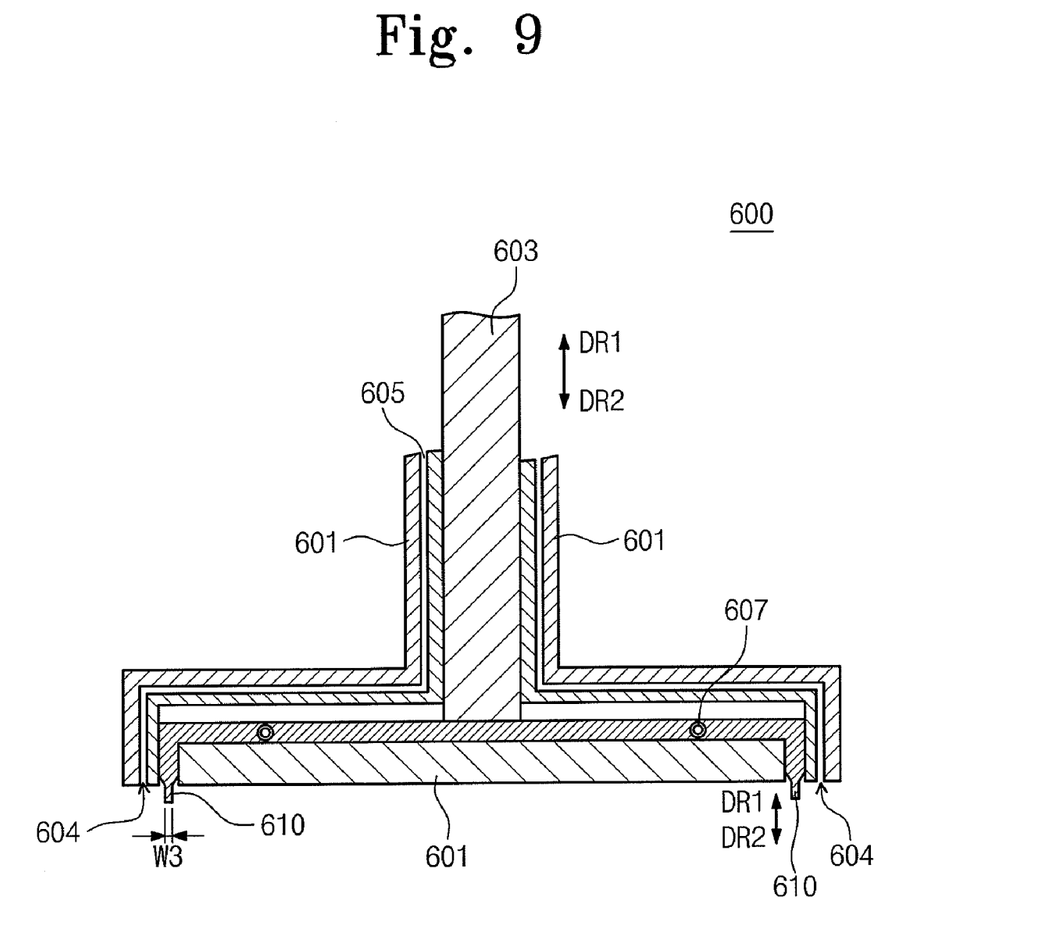
FIG. 9 is a sectional view showing a substrate bonding apparatus of FIG. 5B, according to an exemplary embodiment of the present invention.

FIG. 9 is a sectional view showing the substrate bonding apparatus shown in FIG. 5B.

Referring to FIG. 9, the substrate bonding apparatus 600 used to bond plastic substrates to each other includes a body 601, the pressing member 610, the driving shaft 603, the heating member 607, and a suction unit 604.

The pressing member 610 is provided in the body 601. The width of the pressing member 610 is referred to as a third width W3, and the width of the bonded area of substrates is determined according to the third width W3. The pressing member 610 is coupled to the driving shaft 603. The driving shaft 603 moves in the first and second directions DR1 and DR2, and the pressing member 610 moves in the first and second directions DR1 and DR2 according to the movement of the driving shaft 603.

The heating member 607 applies heat to the pressing member 610 to heat the pressing member 610 at a temperature to permit bonding of the plastic substrates to each other. In addition, the suction unit 604 is provided in the body 601 and connected to an exhaust hole 605. The suction unit 604 generates vacuum pressure to fix a substrate to the body 601.

Accordingly, in an embodiment of the present invention, the pressing member 610 is moved in the first direction DR1 as much as possible such that the pressing member 610 is not protruded out of the body 601, the substrate is fixed to the body 601 by using the suction unit 604, and then the pressing member 610 is moved in the second direction DR2, thereby pressing the substrate fixed to the body 601 into another substrate.

According to the above, heat and pressure are applied to first and second plastic substrates, so that the first and second plastic substrates are coupled to each other without an additional coupling member. Thus, when the display device is manufactured, a process of forming the coupling member interposed between the first and second plastic substrates can be omitted. In addition, reliability of the display device can be improved by avoiding the reduction of the coupling force between the plastic substrates and the coupling member.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
    a first plastic substrate on which a display area and a peripheral area surrounding the display area are defined;
    a plurality of pixels arranged in the display area;
    a second plastic substrate facing the first plastic substrate, wherein the first substrate and the second substrate are in contact with each other in the peripheral area to be bonded to each other in the peripheral area; and
    a first light blocking layer interposed between the first plastic substrate and the second plastic substrate in the peripheral area, wherein the first light blocking layer contacts both the first and second plastic substrates, and wherein the first light blocking layer includes at least two portions forming an oblique anile with respect to each other.

2. The display device of claim 1, wherein the first and second plastic substrates are bonded to each other along an edge of the peripheral area, wherein the bonded area is extended along the edge of the peripheral area.

3. The display device of claim 2, wherein the bonded area has a width of 1 mm or less.

4. The display device of claim 1, wherein the second plastic substrate comprises a second light blocking layer that is arranged corresponding to the pixels and comprises a same material as the first light blocking layer.

5. The display device of claim 1, further comprising an optical shutter interposed between the first and second plastic substrates.

6. The display device of claim 1, wherein the first plastic substrate and the second plastic substrate comprise a thermosetting plastic.

7. The display device of claim 6, wherein the first and second plastic substrates comprise at least one of polyethylene terephthalate (PET), poly carbonate (PC), polyethylene naphthalate (PEN), polyether sulfone (PES), or fiber reinforced plastic (FRP).

8. The display device of claim 1, wherein a cell gap between the first and second substrates in the display area is greater than a cell gap between the first and second substrates in the peripheral area.

9. A method of manufacturing a display device, the method comprising:
    preparing a first plastic substrate on which a display area and a peripheral area surrounding the display area are defined;
    forming a plurality of pixels in the display area;
    arranging the first plastic substrate and a second plastic substrate such that the first plastic substrate faces the second plastic substrate;
    applying heat and pressure to at least one of the first plastic substrate and the second plastic substrate at a location corresponding to the peripheral area to melt the first and second plastic substrates such that the first plastic substrate and the second plastic substrate are bonded to each other; and
    forming a first light blocking layer in the peripheral area, wherein the first light blocking layer is interposed between the first plastic substrate and the second plastic substrate, and the first light blocking layer contacts both the first and second plastic substrates, and wherein the first light blocking layer includes at least two portions forming an oblique angle with respect to each other.

10. The method of claim 9, wherein the first plastic substrate is in direct contact with the second plastic substrate to be directly bonded to the second plastic substrate in the peripheral area.

11. The method of claim 9, further comprising:
    forming a second light blocking layer on the second plastic substrate such that the second light blocking layer is arranged between the pixels, wherein the first light blocking layer being and the second light blocking layer are simultaneously formed.

12. The method of claim 9, further comprising forming an optical shutter between the first and second plastic substrates.

13. The method of claim 9, wherein the first and second plastic substrates comprise a thermo-setting plastic.

14. The method of claim 13, wherein the first and second plastic substrates comprise ethylene terephthalate, the applied heat has a temperature in a range of about 130° C. to about 250° C., and the applied pressure is in a range of about 30 MPa to about 70 MPa.

15. The method of claim 13, wherein the first and second plastic substrates comprise poly carbonate, the applied heat has a temperature in a range of about 170° C. to about 280° C., and the applied pressure is in a range of about 50 MPa to about 85 MPa.

16. The method of claim 13, wherein the first and second plastic substrates comprise polyethylene naphthalate, the applied heat has a temperature in a range of about 150° C. to about 270° C., and the applied pressure is in a range of about 30 MPa to about 70 MPa.

17. The method of claim 13, wherein the first and second plastic substrates comprise polyether sulfone, the applied heat has a temperature in a range of about 230° C. to about 300° C., and the applied pressure is in a range of about 50 MPa to about 100 MPa.

* * * * *